United States Patent
Ruyle

[11] 3,717,623
[45] Feb. 20, 1973

[54] SULFANILYL PHENYL UREA COMPLEXES USEFUL AGAINST MAREK'S DISEASE

[75] Inventor: William V. Ruyle, Scotch Plains, N.J.

[73] Assignee: Merck & Co., Inc., Rahway, N.J.

[22] Filed: April 22, 1970

[21] Appl. No.: 31,025

[52] U.S. Cl..............260/96.5 C, 424/244, 424/251, 424/267, 424/274, 424/322
[51] Int. Cl.............................................C07b 21/00
[58] Field of Search.........260/96.5 R, 96.5 U, 397.6, 260/96.5 C, 96.5 R

[56] References Cited

UNITED STATES PATENTS 2,328,548  9/1943  Dohrn et al. ...................260/397.6
3,329,668  7/1967  McKay ............................260/96.5 R Primary Examiner—Leon Zitver
Assistant Examiner—Michael W. Glynn
Attorney—I. Louis Wolk, J. Jerome Behan and Hesna J. Pfeiffer

[57] ABSTRACT

Novel complexes of 4-sulfanilylphenylurea with an organic compound

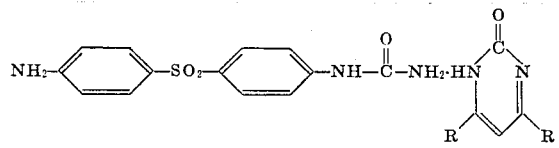

containing the amido linkage

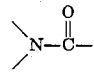

are useful in the treatment and prophylaxis of Marek's disease.

6 Claims, No Drawings

SULFANILYL PHENYL UREA COMPLEXES USEFUL AGAINST MAREK'S DISEASE

ABSTRACT OF THE INVENTION

Novel complexes having the following formulas:

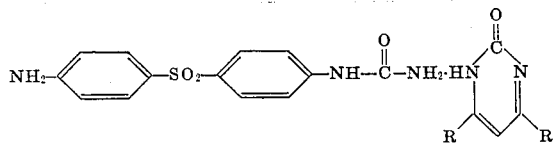

wherein each R is hydrogen or loweralkyl having one to six carbon atoms; or

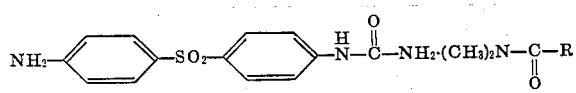

R is the same as above; or

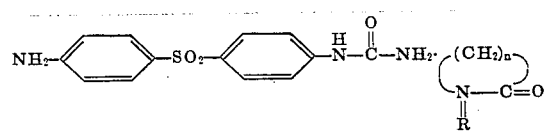

R is the same as above, and *n* is an integer from 2–4; or

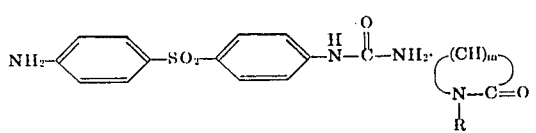

when R is the same as above, and *m* is an integer, either 2 or 4; or

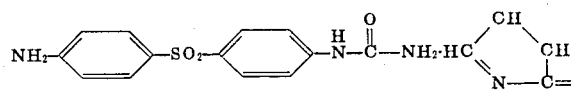

which are useful in the treatment and prophylaxis of Marek's disease.

The present invention encompasses a new class of compounds which were discovered as the reaction product resulting from the chemical combination of a 4-sulfanilyl phenyl urea with an organic compound containing the amido linkage

Although their structure has not yet been fully elucidated, the compounds are apparently molecular addition complexes wherein the proportion of the 4-sulfanilylphenylurea to amido-compound is in the ratio of small whole numbers. This structural hypothesis is supported by the observation that formation of the compounds is not supported by secondary products as is characteristic of metathetical and substitution reactions. That the novel addition complexes are distinct entities having definite chemical composition is supported by the consistent analytical data and sharp melting points of the purified products.

Accordingly, the new chemical entities of the present invention can be depicted as follows:

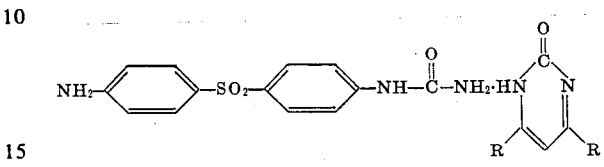

wherein each R is hydrogen or loweralkyl having one to six carbon atoms; or

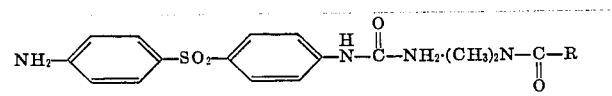

R is the same as above; or

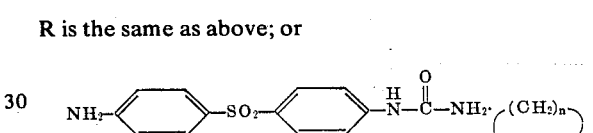

R is the same as above, or

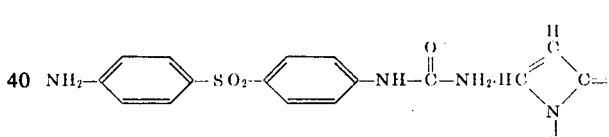

wherein R is the same as above;

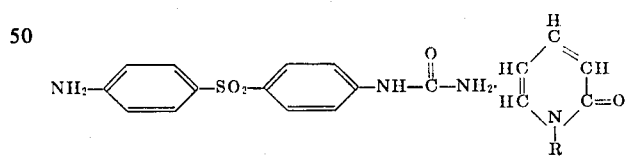

when R is the same as above, and *m* is an integer, either 2 or 4; or

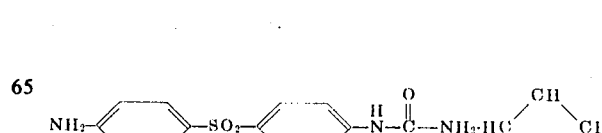

Structures falling within the general formulas above include the addition complexes of 4-sulfanilylphenylurea with the various amido-organic compounds as set forth below. The structures are given in the ketotautomeric form; it will be clear to one skilled in the art that the compounds can also exist in the enol tautomer.

Compound 1 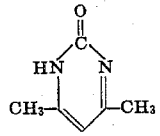

Compound 2 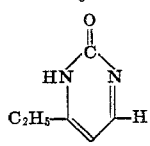

Compound 3 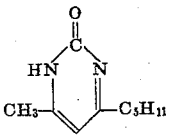

Compound 4 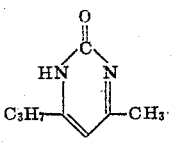

Compound 5 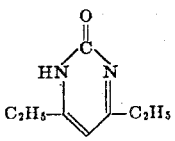

Compound 6 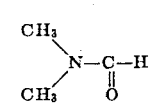

Compound 7 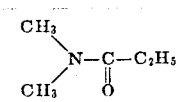

Compound 8 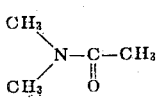

Compound 9 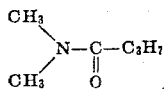

Compound 10 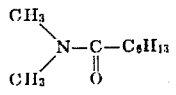

Compound 11 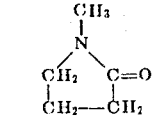

Compound 12 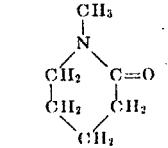

Compound 13 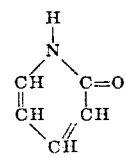

Compound 14 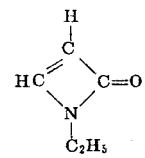

Compound 15 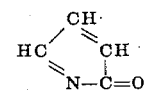

Compound 16 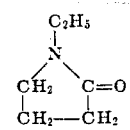

Compound 17 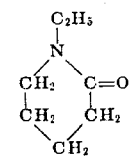

The preferred group of compounds which can form addition complexes with 4-sulfanilylphenylurea are 4,6-dimethyl-2-hydroxypyrimidine, Compound 1; N,N-dimethylformamide, Compound 6; N,N-dimethylacetamide, Compound 8; 1-methyl-2-pyrrolidinone, Compound 11; and 1-methyl-2-pyridone, Compound 12.

In general, the compounds are prepared by bringing together the 4-sulfanilylphenylurea and the amino-organic compound. The reaction is conveniently carried out in the optional presence of a normally liquid organic solvent, suitable examples of which are dimethoxyethane, dimethylformamide, acetone, diethylether, methylethylketone, and the like. The temperature of the reaction is from ambient temperature to about 100°C., and the reaction is completed when the reactants are all dissolved, about 30 minutes to three hours. No solvent is required when the amido-organic compound chosen is a liquid at the reaction temperature.

The reactants combine in simple molar proportions, the ratio of which is of small whole numbers, these preferably being at least one molecule of completely amidocompound per molecule of 4-sulfanilylphenylurea.

The addition complexes of this invention are useful in the treatment and prophylaxis of Marek's disease, to prevent poultry death and sickness as well as to decrease the incidence of lymphoproliferative foci and associated inflammatory-like lesions.

Marek's disease is a highly infections lymphoproliferative disorder of poultry, especially chickens. Marek's disease has also been known as neural leukosis. The causative agent(s) are viral with a DNA-type virus implicated as an etiological factor. Marek's disease often is clinically evident in birds prior to sexual maturity, i.e., before the first egg is laid. Clinical manifestations may be one or more of these signs: regional or generalized paralysis, diarrhea with fecal staining of posterior abdominal feathers, weight loss, dyspnea, blindness, enlarged abdomen or death.

The lesions evident are one or more of the following: lymphocytic infiltrated peripheral nerves and/or feather follicles; lymphoproliferative lesions, microscopic to several mm. in size, within any tissue of the body but principally within the liver, spleen, kidney, gonads, heart, proventriculus, breast muscle, skin, and nerves.

Marek's disease is estimated by the U. S. Department of Agriculture to cause a $200 million annual loss to the U.S. poultry industry. This loss is due to mortality and morbidity and to the rejection of slaughtered bird carcasses as being unfit for human consumption. This rejection is due to the presence of the lymphoproliferative foci.

In this connection, the compounds have proved effective against Marek's disease when orally administered to chickens at a dosage level of 0.002 – 0.1 percent by weight, based on the amount of the compounds in the chicken feed. The compounds can also be administered orally via the drinking water, in levels of 0.0001 to 0.01 percent by weight. An extremely useful and unexpected asset of these addition complexes is their solubility in water and other polar solvents, making them easy to administer via the poultry drinking water route.

The compounds can also be utilized in feed supplement compositions containing from about 2 to 40 percent by weight of the compounds. About 1–5 pounds of this supplement is mixed in a ton of poultry feed by the industry to obtain the desired use level.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

Examples of typical feed supplements containing the compound of the present invention are (A)
| | Lbs. |
|---|---|
| 4-sulfanilylphenylurea · 4,6-dimethyl-2-hydroxy pyrimidine | 3.0 |
| Amprolium | 25.0 |
| Wheat middlings | 72.0 |

(B)
| | |
|---|---|
| 4-sulfanilylphenylurea · N,N-dimethylacetamide | 5.0 |
| Corn gluten feed | 95.0 |

(C)
| | |
|---|---|
| 4-sulfanilylphenylurea · 1-methyl-2-pyrrolidinone | 20.0 |
| Corn germ meal | 40.0 |
| Corn distillers' grains | 40.0 |

The following examples serve to illustrate this invention.

EXAMPLE 1

4-Sulfanilylphenylurea · 4,6-dimethyl-2-hydroxy pyrimidine

A suspension of 485 mg. of 4-(N-sulfanilyl) phenylurea in 5 ml. of dimethoxyethane is heated on the steam bath, and 267 mg. of 4,6-dimethyl-2-hydroxy pyrimidine is added with stirring. Nearly complete solution ensues, followed by precipitation of the complex. The mixture is heated at reflux for a few minutes, then cooled, and the complex collected by filtration. The yield of 4-sulfanilylphenylurea·4,6-dimethyl-2-hydroxy pyrimidine is 570 mg., m.p. 193°–195°C. Anal. Calc'd. for $C_{19}H_{21}N_5O_4S$: C, 54.93; H 5.10; N, 16.86. Found: C,55.39; H, 5.22; N, 16.89. The NMR spectrum in deuteriodimethyl sulfoxide is also indicative of a 1:1 complex.

EXAMPLE 2

4-Sulfanilylphenylurea·N,N-dimethylformamide

One gram of 4-(N-sulfanilyl)phenylurea is dissolved by heating with 2 ml. of N,N-dimethylformamide. On cooling, crystals of the 1:1 complex separate, and are collected by filtration and washed with dimethylformamide and with ether. This complex melts gradually from 110° to 130°C. with subsequent resolidification and remelting at 212°–214°C. The NMR spectrum is indicative of a 1:1 complex, identified as 4-sulfanilylphenylurea·N,N-dimethylformamide.

EXAMPLE 3

4-Sulfanilylphenylurea ·N,N-dimethylacetamide

Using the same procedure as in Example 2, 4-(N-sulfanilyl)phenylurea is heated in N,N-dimethylacetamide. A 1:1 complex is obtained having a melting point of 105°–108°C., identified as 4-sulfanilylphenylurea·N,N-dimethylacetamide.

EXAMPLE 4

4-Sulfanilylphenylurea ·1-methyl-2-pyrrolidinone

To a solution of 200 mg. of 4-(N-sulfanilyl)phenylurea in 0.5 ml. of 1-methyl-2-pyrrolidinone is added 2 ml. of acetone and 10 ml. of ether. The 1:1 complex separates as an oil, which crystallizes gradually, m.p. 170°C. with prior softening.

EXAMPLE 5

4-Sulfanilylphenylurea · 1-methyl-2-pyridone

Using the same procedure as Example 4, 4-(N-sulfanilyl)phenylurea is heated with 1-methyl-2-pyridone. A 1:1 complex is obtained having a melting point of 142°–144°C., identified as 4-sulfanilylphenylurea · 1-methyl-2-pyridone.

What is claimed is:

1. A novel complex chosen from the group consisting of

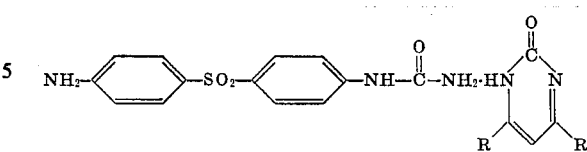

wherein each R is hydrogen or loweralkyl having one to six carbon atoms;

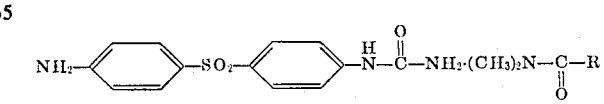

wherein R is the same as above;

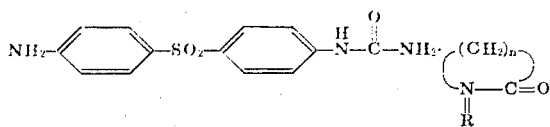

wherein R is the same as above, and *n* is an integer from 2–4;

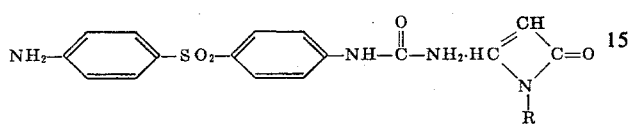

wherein R is the same as above;

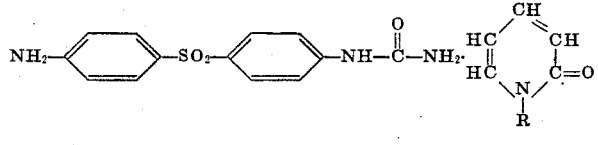

wherein R is the same as above; and

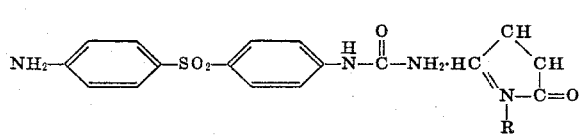

2. The complex of claim 1 in which the organic compound is

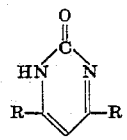

each R being hydrogen or loweralkyl having one to six carbon atoms.

3. The complex of claim 1 in which the organic compound is

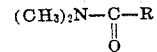

R being hydrogen or loweralkyl having one to six carbon atoms.

4. The complex of claim 1 in which the organic compound is

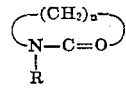

R being hydrogen or loweralkyl having one to six carbon atoms, and *n* being an integer from 2–4.

5. The complex of claim 1 in which the organic compound is

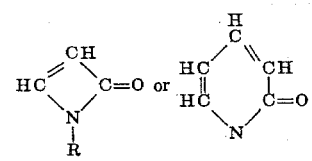

R being hydrogen or loweralkyl having one to six carbon atoms,

6. The complex of claim 1 in which the organic compound is

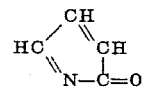

* * * * *